(12) United States Patent
Fiebig et al.

(10) Patent No.: US 8,148,941 B2
(45) Date of Patent: Apr. 3, 2012

(54) EQUIPMENT SYSTEM COMPRISING A BATTERY-OPERATED ELECTRICAL DEVICE, A RECHARGEABLE BATTERY UNIT, AND A BATTERY CHARGER

(75) Inventors: Arnim Fiebig, Leinfelden-Echterdingen (DE); Hans-Joachim Baur, Leinfelden-Echterdingen (DE); Guenther Lohr, Leinfelden-Echterdingen (DE); Stefan Roepke, Leinfelden (DE); Rainer Glauning, Aichtal-Groetzingen (DE); Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 12/414,138

(22) Filed: Mar. 30, 2009

(65) Prior Publication Data
US 2010/0085013 A1 Apr. 8, 2010

Related U.S. Application Data

(63) Continuation of application No. 10/335,842, filed on Jan. 2, 2003, now abandoned.

(30) Foreign Application Priority Data

Jan. 30, 2002 (DE) .................................. 102 03 512

(51) Int. Cl.
*H02J 7/00* (2006.01)
(52) U.S. Cl. .......... 320/114; 320/110; 320/112; 320/132
(58) Field of Classification Search .................. 320/134, 320/136, 114, 106, 112, 126, 132, 101, 142, 320/147
See application file for complete search history.

(56) References Cited

U.S. PATENT DOCUMENTS

| 5,057,383 A | 10/1991 | Sokira |
| 5,206,097 A | 4/1993 | Burns et al. |
| 5,309,080 A | 5/1994 | Odendahl et al. |

(Continued)

FOREIGN PATENT DOCUMENTS

CN 2033781 3/1989

(Continued)

OTHER PUBLICATIONS

Nagai Y et al, "DC Switching Power Supply System Including Monitoring of the Battery", Proceedings of the International Telecommunications Energy Conference (Intelec), Firenze, Oct. 15-18, 1889, vol. 1, No. Conf. 11, Oct. 15, 1989, IEEE, pp. 11-5 1-08, XP0001.

*Primary Examiner* — Melissa Koval
*Assistant Examiner* — Alexis Boateng
(74) *Attorney, Agent, or Firm* — Merchant & Gould, P.C.

(57) ABSTRACT

An equipment system includes a battery unit (10) having a monitoring circuit (14), which detects at least one operating parameter of the battery unit (10) and furnishes a control signal, dependent on the operating parameter, for switching means (25, 31). The switching means control the charging and discharging process of the battery unit (10) and are located in the electrical device (20) and in the charger (30), respectively. From the battery unit (10), the control signal is transmitted to the switching means (25, 31) in the electrical device (20) and in the charger (30), respectively. By this provision of shifting the switching means (25, 31) out of the battery unit (10) into the electrical device (20) and into the charger (30), respectively, the heat development in the battery unit (10) and also its structure size are reduced.

23 Claims, 2 Drawing Sheets

U.S. PATENT DOCUMENTS

| | | | |
|---|---|---|---|
| 5,514,946 A | 5/1996 | Lin et al. | |
| 5,541,489 A | 7/1996 | Dunstan | |
| 5,557,188 A | 9/1996 | Piercey | |
| 5,576,611 A | 11/1996 | Yoshida | |
| 5,606,241 A | 2/1997 | Patino et al. | |
| 5,606,242 A | 2/1997 | Hull et al. | |
| 5,627,449 A * | 5/1997 | Fujiki | 320/106 |
| 5,684,382 A | 11/1997 | Fritz et al. | |
| 5,684,384 A | 11/1997 | Barkat et al. | |
| 5,815,389 A | 9/1998 | Plow et al. | |
| 5,859,524 A | 1/1999 | Ettes | |
| 5,889,381 A * | 3/1999 | Wakefield | 320/106 |
| 5,903,764 A | 5/1999 | Shyr et al. | |
| 5,973,497 A | 10/1999 | Bergk et al. | |
| 5,994,874 A | 11/1999 | Hirose | |
| 6,049,141 A | 4/2000 | Sieminski et al. | |
| 6,078,164 A | 6/2000 | Park | |
| 6,118,255 A | 9/2000 | Nagai et al. | |
| 6,169,341 B1 * | 1/2001 | Nagai | 307/82 |
| 6,384,572 B1 | 5/2002 | Nishimura | |
| 6,388,426 B1 * | 5/2002 | Yokoo et al. | 320/136 |
| 6,445,164 B2 * | 9/2002 | Kitagawa | 320/134 |
| 6,459,175 B1 | 10/2002 | Potega | |
| 6,566,843 B2 * | 5/2003 | Takano et al. | 320/114 |
| 6,777,915 B2 | 8/2004 | Yoshizawa et al. | |
| 2003/0122525 A1 * | 7/2003 | Stellberger | 320/134 |
| 2010/0213900 A1 * | 8/2010 | Carrier et al. | 320/134 |

FOREIGN PATENT DOCUMENTS

| | | |
|---|---|---|
| EP | 0 198 707 A2 | 10/1986 |
| EP | 0 616 281 A2 | 9/1994 |
| EP | 0 665 628 A2 | 8/1995 |
| EP | 1 304 787 A1 | 4/2003 |
| GB | 2 276 783 A | 10/1994 |
| JP | 9-312172 | 12/1997 |
| JP | 11-18314 | 1/1999 |
| JP | 11-500568 | 1/1999 |
| JP | 2000-326265 | 11/2000 |
| JP | 2000350374 | 12/2000 |
| JP | 2001-095158 | 4/2001 |
| JP | 2001-118607 | 4/2001 |
| JP | 2001095158 | 4/2001 |
| JP | 2000/184610 | 4/2009 |
| JP | 7241040 | 8/2010 |
| WO | WO 96/21954 | 7/1996 |
| WO | 01/22107 A1 | 3/2001 |

* cited by examiner

EQUIPMENT SYSTEM COMPRISING A BATTERY-OPERATED ELECTRICAL DEVICE, A RECHARGEABLE BATTERY UNIT, AND A BATTERY CHARGER

CROSS REFERENCE TO RELATED APPLICATIONS

This application is a continuation application of U.S. application Ser. No. 10/335,842, filed Jan. 2, 2003, which claims foreign priority to German Application No. 102 03 512.1, filed Jan. 30, 2002; which applications are incorporated herein by reference in their entireties.

BACKGROUND OF THE INVENTION

The present invention related to an equipment system, comprising at least one battery-operated electrical device, a rechargeable battery unit, and a battery charger, in which the battery unit has a monitoring circuit, which includes at least one operating parameter of the battery unit and furnishes a control signal, dependent on the operating parameter, for switching means that control the charging and discharging process of the battery unit.

In EP 665 628 A2, a recharge battery unit is described, which, on one hand, can be connected to a battery-operated electrical device in order to provide electrical energy to this device, and on the other hand, is useable in a charger device, in order to receive energy from it to its recharger. In the battery unit, a monitoring device is located, which includes at least one operating parameter, for example, the charging or discharge current or the terminal voltage of the battery unit and which furnishes a control signal, dependent on the operating parameter(s), for the switching means furnished in the battery unit, which controls the charging or discharging process of the battery unit. This means, for example, that this switching means interrupts the current flux from the battery unit to a connected electrical device, when the monitoring circuit registers a falling-short of a given discharge increase. Likewise, the control means interrupts the current flux from a charging device in the battery unit, when the control means in initiated by means of the control signal of the monitoring circuit.

In the rechargeable battery unit of EP 665 628 A2, then switching means for controlling the monitoring circuit as well as the charging or discharging process of the battery unit are found. In particular, with battery units, in which very high charging or discharge current flow, such as, for example, with the use of electrical tool apparatus that are operated with relatively high capacity, the switching means must switch very high capacities, which leads to a correspondingly high heat formation in the battery unit. In addition, the structural size of a battery unit increases when a monitoring circuit as well as the switching means for controlling the charging and discharging process are integrated.

Likewise, such a battery unit, which includes the monitoring circuit and the switching means for controlling the charging and discharging process, is expensive. In an equipment system, comprising at least one battery-operated electrical device, a rechargeable battery unit, and a battery charger, the battery unit is subject to the greatest wear. Thus, it is particularly undesirable to raise the price of the battery unit by integration as many electronic switches as possible.

The present invention addresses the underlying problem of providing an equipment system, comprising at least one battery-operated electrical device, a rechargeable battery unit, and a battery recharge of the above-described type, in which the battery unit has the least possible expenditure on electronic switches, in order to avoid the development of heat in the battery unit and, in addition, to maintain the structural size of the battery unit to the smallest possible.

SUMMARY OF THE INVENTION

The above-described problem is resolved by the equipment system of the present invention having a battery unit, a battery charger, and a battery-operated electrical device, only the monitoring device is provided, which detects at least one operating parameter of the battery unit and furnishes a control signal dependent on the at least one operating parameter. The switching means, to which the control signal is supplied, for controlling the charging and discharging process of the battery unit, is located in the electrical device or charging device. Specifically, when the battery unit is connected to the electrical device, the switching means provided therein controls the capacity of the electrical device as a function of the control signal output from the battery unit. And when the battery unit is connected to the charging device, the switching means provided therein controls the transmitted charging current as a function of the control signals produced from the battery unit.

The switching means that control the charging and discharging process of the battery unit are located outside of the battery unit in the device connected to the battery unit. In this manner, the unit that is subject to the greatest wear and that is most frequently changed is disposed within the equipment system in a cost-effective manner.

The operating parameters detected by the monitoring circuit include the charging current flowing into the battery unit, and/or the terminal voltage of the battery unit, and/or the temperature of the battery unit, or a variable that is in relation to the temperature.

DETAILED DESCRIPTION OF THE PREFERRED EMBODIMENTS

Figure 1:
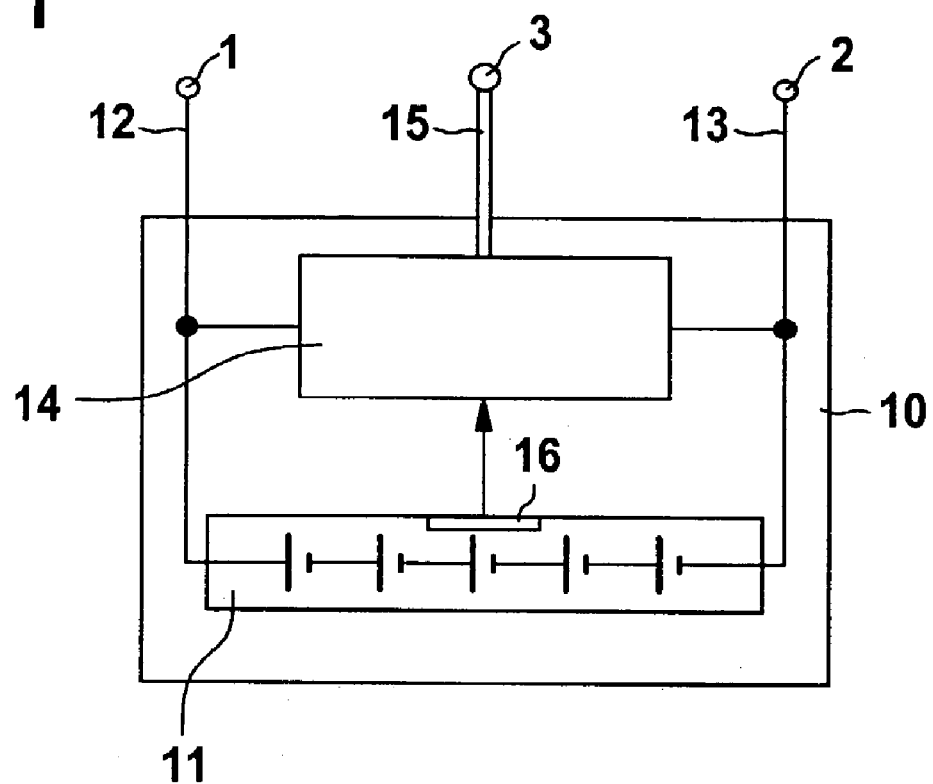
FIG. 1 shows a block diagram of a rechargeable battery unit.
Figure 2:
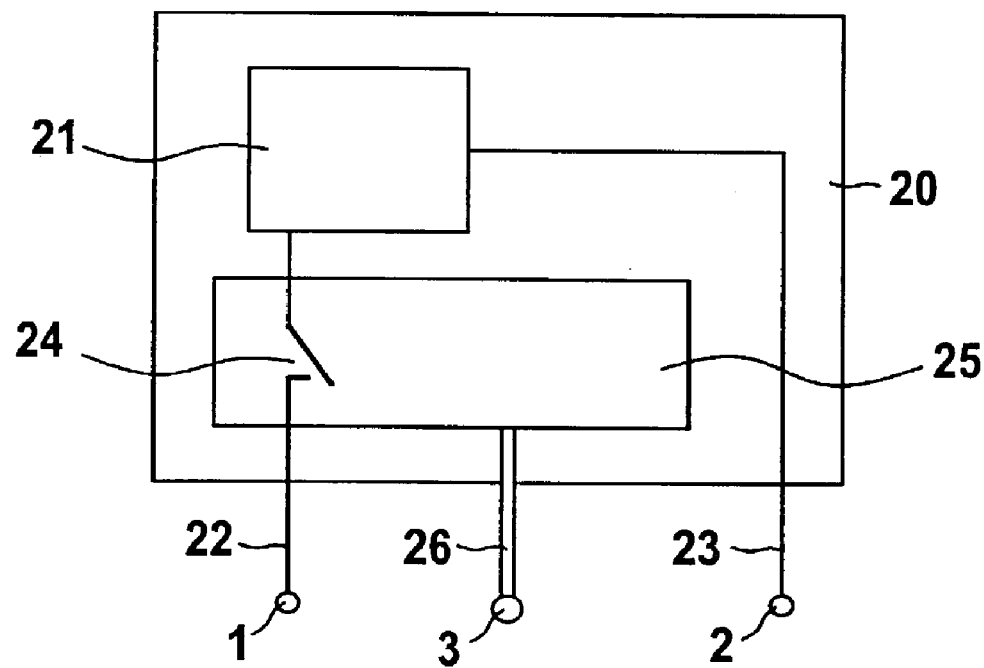
FIG. 2 shows a block diagram of an electrical device.
Figure 3:
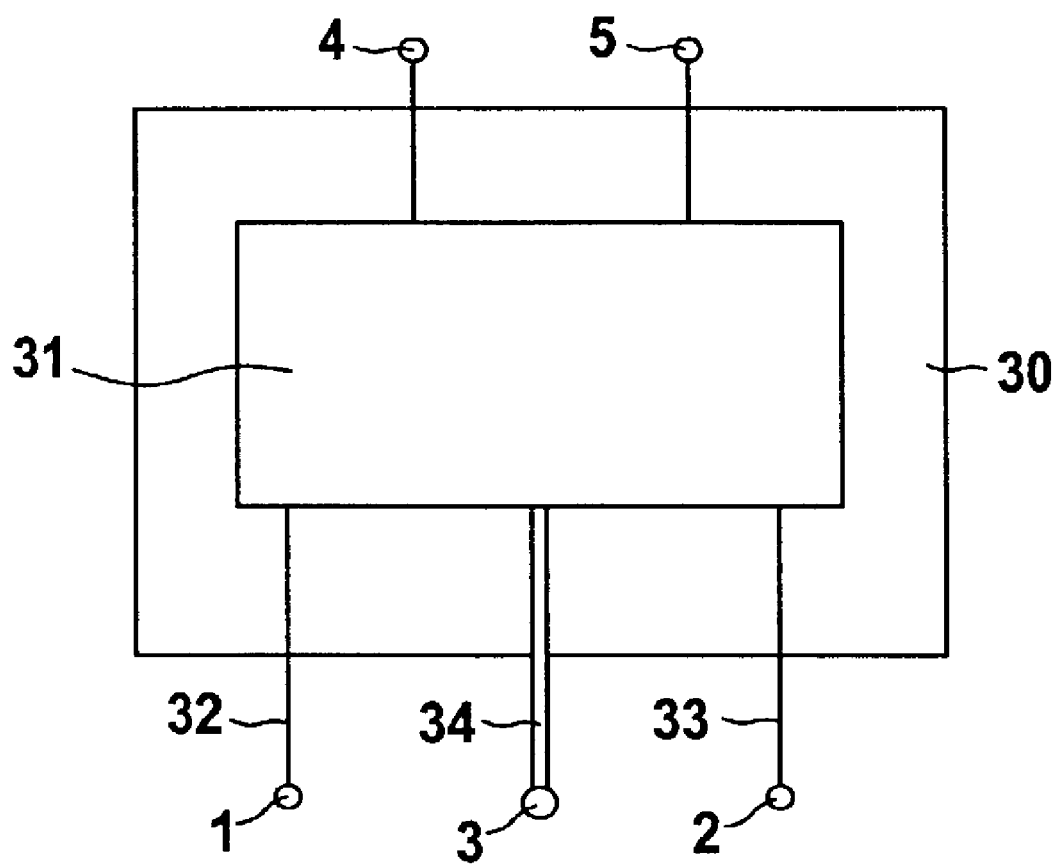
FIG. 3 shows a block diagram of a battery charger.

In FIGS. 1 through 3, the block diagrams of three units belonging to an equipment system are illustrated. FIG. 1 shows a rechargeable battery unit, FIG. 2 shows an electrical device 20—preferably, a hand-held tool (for example, a drill, a hammer drill, a saw, a grinder, and the like), and FIG. 3 shows a battery charger 30. The battery unit illustrated in FIG. 1 is connectable on the one hand to the energy supply on the electrical device 20 and on the other hand, to the recharger on the battery charger 30. The connections or terminals 1, 2, 3 leading from the battery unit 10 have corresponding connections or terminals on the electrical device 20 and the battery charger 30, which are designated with corresponding reference numerals 1, 2, 3.

The battery unit 10 contains one or more rechargeable battery cells 11, from whose plus and minus poles, supply lines 12, 13 lead to external supply connections 1, 2. In the battery unit 10, a monitoring circuit 14 is disposed. This monitoring circuit 14 detects one or more operating parameters of the battery unit, or more precisely, of the battery cells. These operating parameters include, for example, the discharge current—that is the current flowing out of the battery unit upon connection of an electrical device 20—or the charging current—that is, the current flowing into the battery unit upon connection the charging device 30—and/or the terminal voltage of the battery cells(s), and/or the temperature of the battery cell(s), or a variable that is in relation to the temperature. For detection of the temperature of the battery cell(s), a temperature sensor 16 is disposed in the vicinity of the battery cell(s).

The monitoring circuit 14 conducts a control signal for the charging or discharging process of the battery unit from the respective operating parameter. As already known from the state of the art, for example, EP 665 628 A2 or DE 41 06 725 A1, such a control signal that is dependent on one or more operating parameters of the battery unit, serve to interrupt or reduce the current flow from the battery unit to an electric device connected thereto when the battery unit reaches a minimum charge threshold. Or the control signal serves to interrupt or reduced the charging process upon reaching an upper charging threshold or upper temperature threshold when the battery unit 10 is connected to a charging device 30, that is, the current flow between the charging device 30 and the battery unit 10 is interrupted or reduced. The monitoring circuit 14 distributes the control signal via a signal line 15, which leads to an external signal line connection 3.

In FIG. 2, an electrical device 20 that is connectable to the battery unit 2 is illustrated. In the electrical device 20, an electrical drive 21 is located, which, as is common, is an electric motor. Supply lines 22 and 23, which are contactable with the supply lines 12 and 13 of the battery unit 10, lead to the electrical drive 21. In one of the two supply lines 22, 23, an electrically controllable switch 24 is disposed. As the electrically controllable switch, common MOS-FETs are used. For controlling the switch 24, switching means 25 in the electrical device 20 are provided. These switching means 25 receive the control signal from the battery unit 10 via a signal line 26 that is connected to the external signal line connection 3.

In dependence on the information that the control signal is running from the battery unit 10 over the discharge state of the battery unit 10, the switching means 25 controls the switch 24. If, for example, a given minimum charging threshold is registered from the monitoring circuit 14 in the battery unit 10, a corresponding control signal transmitted to the control means 25 enables an opening of the switch 24, so that the electrical device 20 can receive no further current from the battery unit 10. Instead of abruptly switching off the power of the electrical device 20, also, under certain conditions, a gradual downward switching of the power by means of the control means 25 in dependence on the control signal from the monitoring circuit 14 can be performed. Overall, the consumption of power through the electrical device 20 via the switching means 25 is controlled such that the maximum threshold value of the consumption of power is adapted constantly to the actual charging state of the battery unit 10. In this manner, the battery unit 10 operates in view of the longest possible longevity.

In the battery charger 30 illustrated in FIG. 3, a controllable current or voltage source 31 is disposed. This controllable current or voltage source includes on one hand power supplies 4 and 5, and on the other hand, guide supply lines 32 and 33 to the external supply line connections 1 and 2. Via a signal line 34, which leads to the external signal line connection 3, the controllable current or voltage source 31 receives the control signal generated from the monitoring circuit 14 in the battery unit 10. Control means in the controllable current or voltage source 31 control the charging current flowing over the supply lines 32, 33 to the battery unit 10 in dependence on the control signal formed in the battery unit 10 and transmitted to the battery charger 30. In particular, the control signal signals the switching means in the controllable current and voltage source 31, when the battery unit 10 has reach an upper charging threshold, as a result of which then the charging current is switched off or gradually driven downward from the controllable current or voltage source 31.

As previously illustrated, an information exchange via the signal lines 15, 26, 34 between the battery unit 10, the electrical device 20, and the battery charger 30 is constant. This information exchange can not only lead unidirectionally from the battery unit 10 to the electrical device 20 or battery charger 30, but also in the reverse direction. As a result of this reciprocal information exchange about the actual operating state of the respective devices 10, 20, 30, an overloading and, correspondingly, a high wear of the devices is substantially reduced.

Advantageously, the signal lines 15, 16, 34 for the reciprocal information exchange are embodied as bus lines, over which control signal data as serial data currents can be transmitted unidirectionally or bidirectionally.

It will be understood that each of the elements described above, or two or more together, may also find a useful application in other types of constructions differing from the types described above.

While the invention has been illustrated and described herein as an equipment system comprising a battery-operated electrical device, a rechargeable battery unit, and a battery charger, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention.

What is claimed as new and desired to be protected by Letters Patent is set forth in the appended claims.

The invention claimed is:

1. An electrical device, being electrically connectable to a battery unit for energy supply, comprising:
   an electric motor;
   a plurality of supply lines connected to the electric motor and electrically contactable to supply lines of the battery unit;
   a switch system included in the electrical device and configured to control a current flow on the plurality of supply lines to the electric motor of said electrical device from the battery unit, and
   a receive unit within the electrical device configured to receive a control signal from a signal line electrically connectable to a monitoring circuit of the battery unit,
   wherein said switch system of the electrical device is controlled by said control signal output from the monitoring circuit of the battery unit, and
   wherein the monitoring circuit is configured to detect at least one operating parameter of the battery unit, and from said at least one operating parameter, derives the control signal for controlling a current flow from the battery unit to the electrical device.

2. The electrical device of claim 1, wherein
said at least one operating parameter detected by said monitoring circuit is a current flowing into or out of said battery unit and/or a terminal voltage of said battery unit and/or a temperature of said battery unit and/or a temperature dependent parameter of said battery unit.

3. The electrical device of claim 1, wherein
said switch system is configured to control the power consumption of said electrical device such that the maximum power consumption of said electrical device is constantly adapted to the actual charging state of the battery unit.

4. The electrical device of claim 1, wherein
said receive unit is configured to transmit information unidirectionally.

5. The electrical device of claim 1, wherein
said receive unit is configured to transmit information bidirectionally.

6. A handheld tool electrically connectable to a battery unit for energy supply; the handheld tool comprising:
   a switch system within the handheld tool configured to control a current flow to an electric motor of the handheld tool from the battery unit on a plurality of supply lines;
   a receive unit within the handheld tool configured to receive a control signal from a signal line electrically connectable to a monitoring circuit of the battery unit; the switch system being controlled by an output of said control signal from the signal line of the monitoring circuit of the battery unit; and
   wherein the monitoring circuit is configured to detect at least one operating parameter of the battery unit, and from said at least one operating parameter, derive the control signal for controlling a current flow from the battery unit to the handheld tool.

7. The handheld tool of claim 6 wherein:
said at least one operating parameter detected by said monitoring circuit is a current flowing into or out of said battery unit, or a terminal voltage of said battery unit or a temperature of said battery unit, or a temperature dependent parameter of said battery unit.

8. The handheld tool of claim 6 wherein:
said switch system is configured to control power consumption of the handheld tool such that maximum power consumption of the handheld tool is constantly adapted to an actual charging state of the battery unit.

9. The handheld tool of claim 6, wherein:
said receive unit is configured to transmit information unidirectionally.

10. The handheld tool of claim 6, wherein:
said receive unit is configured to transmit information bidirectionally.

11. A handheld tool comprising:
a battery unit which is electrically connectable to the handheld tool, the battery unit comprising:
   a monitoring circuit configured to detect at least one operating parameter of the battery unit, and from said at least one operating parameter, derive a control signal for controlling a discharging process of the battery unit;
said handheld tool comprising:
   an electric motor;
   a plurality of supply lines connected to the electric motor and connectable to the battery unit;
   a switch system configured to control current flow from the battery unit to the handheld tool on the plurality of supply lines; and
   a receive unit including a signal line configured to receive the control signal from the monitoring circuit of the battery unit;
   wherein the switch system is controlled by the control signal output of the monitoring circuit of the battery unit.

12. The handheld tool of claim 11 wherein said at least one operating parameter detected by the monitoring circuit is: (i) a current flowing into or out of the battery unit, or (ii) a terminal voltage of the battery unit, or (iii) a temperature of the battery unit, or (iv) a temperature dependent parameter of the battery unit.

13. The handheld tool of claim 11 wherein the battery unit further comprises a transmit unit configured to transmit the control signal to the switch system of the handheld tool.

14. The handheld tool of claim 13 wherein the transmit unit comprises a signal line.

15. The handheld tool of claim 14 wherein the signal line of the handheld tool and the signal line of the battery unit are connectable to one another.

16. The handheld tool of claim 11 wherein the battery unit further comprises a temperature sensor arranged in a vicinity of at least one battery cell in the battery unit.

17. The handheld tool of claim 11 wherein the control signal serves to interrupt or reduce a current flow from the battery unit to the handheld tool when the battery unit reaches a given minimum discharge threshold.

18. The handheld tool of claim 11 wherein the transmit unit of the battery unit and the receive unit of the handheld tool are configured to transmit information unidirectionally.

19. The handheld tool of claim 11 wherein the transmit unit of the battery unit and the receive unit of the handheld tool are configured to transmit information bidirectionally.

20. The handheld tool of claim 11 wherein the switch system comprises an electrically controllable switch.

21. The handheld tool of claim 20 wherein the switch is arranged in at least one supply line of the handheld tool; said at least one supply line being connectable with at least one supply line of the battery unit.

22. The handheld tool of claim 11 wherein the switch system is configured to control the power consumption of the handheld tool such that a maximum power consumption of the handheld tool is constantly adapted to the actual charging state of the battery unit.

23. A handheld tool comprising:
an electric motor;
a detachable battery unit comprising a transmit unit configured to transmit a control signal to said handheld tool, the control signal containing information about an actual operating state of the battery unit,
a plurality of supply lines electrically connected between the electric motor and the battery unit; and
said handheld tool comprising a receive unit including a signal line configured to receive the control signal from the transmit unit of the battery unit.

* * * * *